(12) United States Patent
Dejanovic

(10) Patent No.: US 11,139,904 B2
(45) Date of Patent: Oct. 5, 2021

(54) CLOCK DOMAIN CROSSING BUFFER

(71) Applicant: Arista Networks, Inc., Santa Clara, CA (US)

(72) Inventor: Thomas Dejanovic, Sydney (AU)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/652,473

(22) PCT Filed: Oct. 17, 2018

(86) PCT No.: PCT/AU2018/000199
§ 371 (c)(1),
(2) Date: Mar. 31, 2020

(87) PCT Pub. No.: WO2019/075504
PCT Pub. Date: Apr. 25, 2019

(65) Prior Publication Data
US 2020/0235836 A1 Jul. 23, 2020

(30) Foreign Application Priority Data
Oct. 17, 2017 (AU) .............................. 2017904204

(51) Int. Cl.
*H04J 3/06* (2006.01)
*G06F 5/06* (2006.01)
*H04J 3/14* (2006.01)
(52) U.S. Cl.
CPC .............. *H04J 3/0679* (2013.01); *G06F 5/06* (2013.01); *H04J 3/0638* (2013.01); *H04J 3/0682* (2013.01); *H04J 3/14* (2013.01)

(58) Field of Classification Search
CPC ...... H04J 3/0679; H04J 3/0638; H04J 3/0682; H04J 3/14; H06F 5/06; H06F 13/4278; H06F 13/1689; H06F 13/00; H06F 1/12
See application file for complete search history.

(56) References Cited

U.S. PATENT DOCUMENTS

2007/0046309 A1* 3/2007 LaBerge .......... G11C 29/56012
324/750.01
2008/0172540 A1* 7/2008 Lemke ................. G06F 13/4059
711/167

(Continued)

OTHER PUBLICATIONS

International Search Report issued in corresponding Application No. PCT/AU2018/000199, dated Jan. 31, 2019.

(Continued)

*Primary Examiner* — Abdelnabi O Musa
(74) *Attorney, Agent, or Firm* — Chamberlain, Hrdlicka, White, Williams & Aughtry

(57) ABSTRACT

Methods and systems for performing clock domain crossing. The method may include receiving a start signal from an ingress domain delay device at a first egress domain delay device. The start signal may be received at a first rising edge of an egress domain clock cycle. The method may also include receiving, from the first egress domain delay device at a start receive device, the start signal at a second rising edge of the egress domain clock cycle. The second rising edge may be N egress domain clock cycles after the first rising edge. The method may also include incrementing, in response to receipt of the start signal by the start receive device, a buffer read pointer of the buffer by at least N buffer addresses, and reading, after incrementing the buffer read pointer, a second data unit from the buffer at a location indicated by the buffer read pointer.

20 Claims, 5 Drawing Sheets

(56) References Cited

U.S. PATENT DOCUMENTS

| | | | |
|---|---|---|---|
| 2008/0195774 A1* | 8/2008 | Lemke | G06F 13/4059 |
| | | | 710/57 |
| 2009/0240969 A1* | 9/2009 | Chiu | G06F 13/4278 |
| | | | 713/401 |
| 2013/0121100 A1* | 5/2013 | Deivasigamani | G06F 13/1689 |
| | | | 365/233.11 |
| 2013/0205160 A1* | 8/2013 | Turner | G06F 1/12 |
| | | | 713/400 |
| 2014/0062555 A1 | 3/2014 | Osborn et al. | |
| 2015/0026494 A1 | 1/2015 | Bainbridge et al. | |

OTHER PUBLICATIONS

Written Opinion issued in corresponding Application No. PCT/AU2018/000199, dated Jan. 31, 2019.

* cited by examiner

CLOCK DOMAIN CROSSING BUFFER

BACKGROUND

Computing devices (e.g., network devices), or portions thereof (e.g., processors, data busses, etc.), often use clocks to control the timing of actions taken by components therein. Such clocks, either in different computing devices or within the same computing device, often have clock cycles that may differ in phase and/or frequency. Each device or portion thereof that uses a single clock may be referred to as a clock domain. Differences in clock cycles should be accounted for when data is transferred between clock domains.

SUMMARY

In general, in one aspect, embodiments of the invention relate to a method for performing clock domain crossing. The method may include receiving a start signal from an ingress domain delay device of an ingress clock domain at a first egress domain delay device of an egress clock domain. The start signal may be received at a first rising edge of an egress domain clock cycle. The start signal may be generated in an ingress clock domain at a rising edge of an ingress clock cycle when a first data unit is written into a buffer, a write buffer pointer may be incremented after the first data unit is written into the buffer, and the start signal may be obtained by the ingress domain delay device at a next falling edge of the ingress clock cycle. The method may also include receiving, from the first egress domain delay device at a start receive device, the start signal at a second rising edge of the egress domain clock cycle. The second rising edge may be N egress domain clock cycles after the first rising edge. The method may also include incrementing, in response to receipt of the start signal by the start receive device, a buffer read pointer of the buffer by at least N buffer addresses, and reading, after incrementing the buffer read pointer, a second data unit from the buffer at a location indicated by the buffer read pointer.

In general, in one aspect, embodiments of the invention relate to a system for performing clock domain crossing. The system may include a first egress domain delay device of an egress clock domain that includes circuitry and is operatively connected to an ingress domain delay device of an ingress clock domain. The first egress domain delay device may be configured to receive, from the ingress domain delay device, a start signal at a first rising edge of an egress domain clock cycle. The start signal may be generated in an ingress clock domain at a rising edge of an ingress clock cycle when a first data unit is written into a buffer. A write buffer pointer may incremented after the first data unit is written into the buffer. The start signal may be obtained by the ingress domain delay device at a next falling edge of the ingress clock cycle. The system may also include a start receive device that includes circuitry and is operatively connected to the first egress domain delay device. The start receive device may be configured to receive the start signal at a second rising edge of the egress domain clock cycle. The second rising edge may be N egress domain clock cycles after the first rising edge. The start receive device may also be configured to increment, in response to receipt of the start signal by the start receive device, a buffer read pointer of the buffer by at least N buffer addresses, and read, after incrementing the buffer read pointer, a second data unit from the buffer at a location indicated by the buffer read pointer.

Other aspects of the invention will be apparent from the following description and the appended claims.

DETAILED DESCRIPTION

Figure 1:
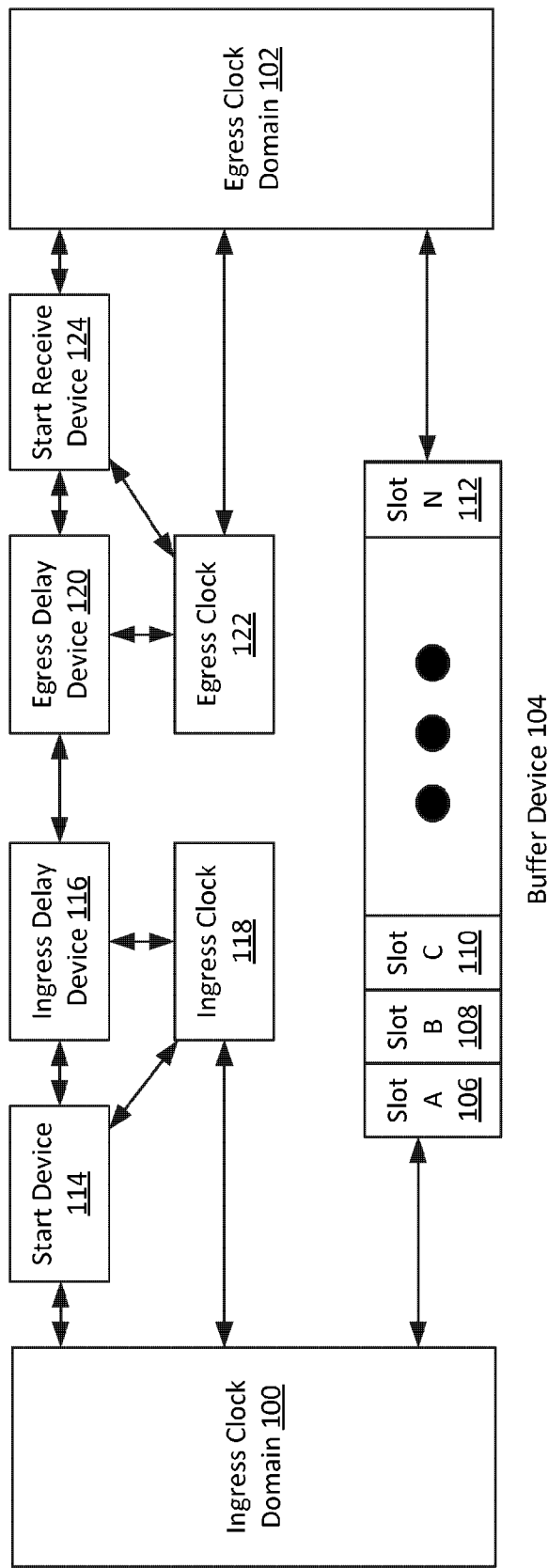
FIG. 1 shows a system in accordance with one or more embodiments of the invention.

Specific embodiments will now be described with reference to the accompanying figures. In the following description, numerous details are set forth as examples of the invention. It will be understood by those skilled in the art, and having the benefit of this Detailed Description, that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure, or that is otherwise described herein, is incorporated by reference and assumed to be optionally present within every other figure and/or embodiment having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure and/or embodiment.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to systems and methods for reducing latency when transmitting data between clock domains (i.e., performing clock domain crossing). Specifically, in one or more embodiments of the invention, data generated by an ingress clock domain is written to a buffer (e.g., a first in first out (FIFO) buffer) shared between an ingress clock domain and an egress clock domain. In one or more embodiments of the invention, a clock domain is a device and/or set of components that share a common clock with a clock cycle regulating when actions are taken. In one or more embodiments of the invention, data is written to the buffer by an ingress clock domain, and then a write buffer pointer is incremented to a subsequent address. The egress clock domain may then read data from the buffer, and then increment a read buffer pointer.

In one or more embodiments of the invention, when the frequencies of the clocks in the ingress and egress clock domains are substantially similar, a first egress delay device may be added to the egress domain that adds a latency of N egress clock cycles to the crossing of data between the clock domains by delaying for N (e.g., two) clock cycles a start signal that, once received, causes the egress clock domain to read data from the buffer. In one or more embodiments of the invention, the first egress delay device samples the start signal on a rising clock edge of the egress clock cycle.

Additionally, in one or more embodiments of the invention, an ingress delay device may be included that introduces a delay in the ingress clock domain before the start signal is transmitted to the egress clock domain. In one or more embodiments of the invention, the ingress delay device samples the start signal on a falling edge of the ingress domain clock cycle. In such embodiments, when the ingress clock domain asserts the start signal on a rising edge of the ingress clock domain clock cycle, the ingress delay device introduces a half of an ingress clock cycle of delay.

In one or more embodiments of the invention, once the start signal assert passes from the egress clock domain delay device to a start receive device, a read buffer pointer that indicates where a data unit is to be read from is incremented by N buffer addresses, thereby reducing clock domain crossing latency to no more than 1.5 egress domain clock cycles, at the expense of losing N data units. In one or more embodiments of the invention, the lost N data units are part of a training set of data units and, as such, are not needed by the egress clock domain. In one or more embodiments of the invention, a data unit is then read from the buffer address indicated by the previously incremented read buffer pointer.

In one or more embodiments of the invention, a second egress delay device is added to the egress domain. In one or more embodiments of the invention, the second egress delay device also receives the start signal from the ingress delay device, but, unlike the first egress delay device, samples the start signal on the falling edge of the egress domain clock cycle, and sends the sampled start signal to the start receive device as a late start signal. In one or more embodiments of the invention, the start receive device also samples the late start signal and, if both the start signal and the late start signal are asserted, increments the read buffer pointer by N+1 buffer addresses rather than N. In one or more embodiments of the invention, incrementing the read buffer pointer by N+1 buffer addresses may further reduce latency of the clock domain crossing to half to one egress domain clock cycle.

In one or more embodiments of the invention, after the start signal has been processed by the start receive device, and data units are being transferred between the ingress clock domain and the egress clock domain, the egress clock domain may make a determination regarding the relative clock domain cycle frequencies of the ingress and egress clock domains. In the event that the frequency of the egress clock domain is higher, the egress clock domain may cause the frequency of the egress clock domain to reduce such that it is lower than that of the ingress clock domain cycle. If, on the other hand, the ingress clock domain frequency is higher than that of the egress clock domain, the egress clock domain may further include a buffer depth monitor device to monitor a read buffer depth.

In one or more embodiments of the invention, each time the ingress domain writes to the buffer, a write alert is sent to the depth monitor device, and a depth counter is incremented. If the depth counter exceeds N (i.e., the delay introduced by the egress delay devices), then the depth monitor device may cause the egress domain to check data units that are read from the buffer to determine if the data units are idle data units. If a read data unit is an idle data unit, the egress clock domain may increment the read buffer pointer by N buffer addresses, which may correspond to the number of idle data units in a row in the buffer. In one or more embodiments of the invention, if the depth counter exceeds a threshold, indicating the buffer is at or close to full, the depth monitor device may request the ingress domain to perform a buffer depth reduction action (e.g., pause writing onto the buffer, send more idle data units, etc.).

FIG. 1 shows a system in accordance with one or more embodiments of the invention. As shown in FIG. 1, the system includes an ingress clock domain (100), an egress clock domain (102), a buffer (104), a start device (114), an ingress delay device (116), an ingress clock (118), an egress delay device (120), an egress clock (122), and a start receive device (124). In one or more embodiments of the invention, the buffer (104) includes any number of buffer slots (e.g., buffer slot A (106), buffer slot B (108), buffer slot C (110), buffer slot N (112)), each of which correspond to a buffer address. Each of these components is described below.

In one or more embodiments of the invention, a clock domain (e.g., ingress clock domain (100), egress clock domain (302)) is any device, portion of a device, set of components, etc. that share a common clock. For example, a clock domain may be a portion of the components of a computing device that are operatively connected to another clock domain, which may be a different portion of the components of the computing device, or components of a different computing device. As another example, one clock domain may exist on one network device, and be operatively connected to a clock domain of another network device. As used herein, the phrase 'operatively connected' refers to any direct (e.g., physical wiring) or indirect (e.g., connected via any number of other devices or components) connection.

In one or more embodiments of the invention, a computing device is any device, any set of devices, or any portion of a device, capable of electronically processing instructions and/or transmitting information, and that includes, at least, one or more processors, memory, input and output device(s). Examples of computing devices include, but are not limited to, a server (e.g., a blade-server in a blade-server chassis, a rack server in a rack, etc.), a virtual machine (VM), a desktop computer, a mobile device (e.g., laptop computer, smart phone, personal digital assistant, tablet computer and/or any other mobile computing device), a network device (e.g., switch, router, multi-layer switch, etc.), and/or any other type of computing device with the aforementioned requirements.

In one or more embodiments of the invention, a computing device such as a network device is a physical device that includes, but is not limited to, all or any subset of the following: persistent storage (not shown), memory (e.g., random access memory (RAM)) (not shown), one or more processor(s) (not shown), one or more network chips, one or more circuit components (e.g., wire, resistors, capacitors, transistors, inductors, integrated circuitry packages, printed circuit boards, diodes, comparators, etc.), one or more field programmable gate arrays (FPGAs), one or more application specific integrated circuits (ASICs), one or more complex programmable logic devices (CPLDs) and two or more physical network interfaces (which may also be referred to as ports). A network device may be connected to other devices via wired (e.g., using the ports) and/or wireless connections.

In one or more embodiments of the invention, a network device includes functionality to receive data units at any of the physical network interfaces (i.e., ports) of the network device, and to subsequently transmit the data units from any of the physical network interfaces of the network device. In one or more embodiments of the invention, one all or a portion of a first network device may operate one clock domain, and interface with all or a portion of another network device that operates as a second clock domain.

One example of a network device is a lower layer device. In one or more embodiments of the invention, a lower layer device is a device that includes one or more physical layer switches configured to provide physical connections between ports of the lower layer switch. A physical layer switch may be implemented as a crossbar switch, which has multiple input and output lines arranged in a crossed pattern, with each intersection serving as a switch that may be open to prevent a connection between two ports, or closed to form a connection between two ports of the lower layer device.

Physical layer switches may include functionality to receive data units from a given port of a lower layer device and, based on the configured connections of the physical layer switch, transmit the received data unit to one or more other ports to be transmitted toward whatever is connected to the output port. As used herein, the term lower layer device may refer to devices that also include additional hardware (e.g., FPGA(s)) and/or software to allow for reconfiguration of the connections and other functionality (e.g., aggregation). Such lower layer devices may, for example, function as reconfigurable patch panels. The reconfiguration may occur, for example, via a network administrator using management software to interact, over a network, with any of the hardware and/or software of the lower layer device to reconfigure the connections. Other functionality that may exist in a lower layer device, which may be enabled by additional hardware and/or software, includes, but is not limited to, media conversion, failover, data replication, aggregation, broadcast, monitoring, traffic sampling, multiplexing, filtering, etc.

Other examples of a network device include a higher level network device. Examples of a higher level network device include, but are not limited to, a layer 2 network switch, a router, a multilayer switch, a fibre channel device, an InfiniBand® device, etc. Higher level devices may include functionality to inspect all or certain portions of a data unit in order to determine whether to: (i) drop the data unit; (ii) process the data unit; and/or (iii) transmit the data unit, based on the processing, from a physical network interface or port on the higher level network device.

In one or more embodiments of the invention, a network device includes functionality to store (e.g., in persistent storage, in memory, in a register, etc.), any number of data structures (e.g., filtering information, delay time information, routing information base (RIB), forwarding information base (FIB), link state database, counters, etc.) for facilitating operation of at least some aspects of the network device.

Such structures may be stored in a data repository (not shown) included in and/or operatively connected to the network device. In one or more embodiments of the invention, a data repository is any type of storage unit(s) and/or device(s) (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments of the invention, the network device data repository includes all or any portion of the persistent and/or non-persistent storage of the network device as described above.]]

In one or more embodiments of the invention, network devices are connected vi a network. In one or more embodiments of the invention, a network may be an entire network or any portion thereof. A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet. In one or more embodiments of the invention, a network, and any network devices therein, may be arranged in any network topology. In one or more embodiments of the invention, a network topology is an arrangement of various elements of a network.

In one or more embodiments of the invention, any clock domain (e.g., clock domain (100), clock domain (102)) also includes software and/or firmware stored in any data repository (not shown) and/or memory (not shown) (i.e., non-transitory computer readable mediums). Such software and/or firmware may include instructions which, when executed by the one or more processors (not shown) of a clock domain, cause the one or more processors to perform operations in accordance with one or more embodiments of the invention. The instructions may be in the form of computer readable program code to perform embodiments of the invention, and may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform functionality related to embodiments of the invention.

In one or more embodiments of the invention, each of the ingress clock domain (100) and the egress clock domain (102) are operatively connected to a buffer (104). In one or more embodiments of the invention, the buffer (104) includes any number of buffer slots (106, 108, 110, 112), each of which are identified by a unique buffer address. In one or more embodiments of the invention, the buffer (104) is a storage device for storing data units in the buffer slots that are to be transferred from the ingress clock domain (100) to the egress clock domain (102). In one or more embodiments of the invention, the buffer includes a write buffer pointer (not shown) that points to the buffer address that is to be written to next by the ingress clock domain (100), and a read buffer pointer (not shown) that is to be read from next by the egress clock domain. In one or more embodiments of the invention, the location of the read buffer pointer is initialized at the same location as the write buffer pointer, and is equal to or trailing the location of the write buffer pointer thereafter during transfer of a stream of data units from the ingress clock domain (100) to the egress clock domain (102), thereby ensuring that the data from the ingress clock domain is successfully transferred to the egress clock domain.

In one or more embodiments of the invention, the buffer (104) is included as a component within a computing device of which the egress clock domain (102) is also a component. In other embodiments of the invention, the buffer (104) is included as a component within a computing device of which the ingress clock domain (100) is also a component. In other embodiments of the invention, the buffer (104) is a component separate from an operatively connected to both the ingress clock domain (100) and the egress clock domain (102).

In one or more embodiments of the invention, the ingress clock domain (100) includes or (as shown in FIG. 1) is operatively connected to an ingress clock (118). In one or more embodiments of the invention, the ingress clock (118) is any component or set of components that provides a clock cycle with a given frequency, which is used by components within the ingress clock domain (100) to determine when actions should be performed. For example, the rising or falling edge of the clock cycle of the ingress clock (118) may be used by various components of the ingress clock domain (100) to determine when to sample one or more data inputs and/or transfer input data to one or more data outputs. As an example, the ingress clock (118) may include a crystal that, when subjected to a given electrical signal, oscillates in a regular manner.

In one or more embodiments of the invention, the egress clock domain (102) includes or (as shown in FIG. 1) is operatively connected to an egress clock (122). In one or more embodiments of the invention, the egress clock (122) is any component or set of components that provides a clock cycle with a given frequency, which is used by components within the egress clock domain (100) to determine when actions should be performed. For example, the rising or falling edge of the clock cycle of the egress clock (122) may be used by various components of the egress clock domain (102) to determine when to sample one or more data inputs and/or transfer input data to one or more data outputs. As an example, the egress clock (122) may include a crystal that, when subjected to a given electrical signal, oscillates in a regular manner.

In one or more embodiments of the invention, the system includes a start device (114) that is operatively connected to (as shown in FIG. 1) or included in the ingress clock domain (102). In one or more embodiments of the invention, a start device is any hardware (e.g., circuitry), software, firmware, and/or combination thereof that includes functionality to generate a start signal. In one or more embodiments of the invention, a start signal is a signal generated after a power up or reset of a device that is or includes an ingress clock domain (100), and is generated when a first data unit is written into a buffer (104) that operatively connects the ingress clock domain (100) with an egress clock domain (102). In one or more embodiments of the invention, the start signal is generated on a rising edge of the clock cycle generated by the ingress clock (118)

In one or more embodiments of the invention, the start device (114) is operatively connected to an ingress delay device (116). In one or more embodiments of the invention, the ingress delay device is any hardware (e.g., circuitry), software, firmware, and/or combination thereof that includes functionality to delay the start signal from the start device (114). In one or more embodiments of the invention, the ingress delay device includes functionality to sample the start signal at a rising or falling edge of the clock cycle generated by the ingress clock (118). For example, the ingress delay device (116) may be a delay flip flop that is configured to sample the start signal on the falling edge of the ingress clock cycle, and, if asserted, propagate the asserted start signal to an output of the ingress delay device. In such embodiments of the invention, the sampling of the start signal on the falling edge of the ingress clock cycle may capture the assert of the start signal half of a clock cycle after the start signal was asserted by the start device, which may gain a latency reduction of half of a clock cycle over capturing the assert of the start signal at the next rising clock signal.

In one or more embodiments of the invention, the ingress delay device (116) is operatively connected to an egress delay device (120). In one or more embodiments of the invention, the egress delay device is any hardware (e.g., circuitry), software, firmware, and/or combination thereof that includes functionality to receive the start signal from the ingress delay device (116) and to delay the start signal for N egress clock (122) cycles. In one or more embodiments of the invention, N is the number of egress clock cycles that the start signal is delayed by the egress delay device (120). For example, the egress delay device (120) may include two delay flip flops, each of which serves to delay the start signal by one egress clock cycle, making N equal to two.

In one or more embodiments of the invention, the egress delay device (120) is operatively connected to a start receive device (124). In one or more embodiments of the invention, the start receive device (124) is any hardware (e.g., circuitry), software, firmware, and/or combination thereof that includes functionality to receive the start signal from the egress delay device and, in response to the receipt, read a data unit from the buffer at a read buffer pointer location, increment the read buffer pointer, and provide the read data unit to any other portion of the egress clock domain (102).

While FIG. 1 shows a configuration of components, other configurations may be used without departing from the scope of the invention. Accordingly, embodiments disclosed herein should not be limited to the configuration of components shown in FIG. 1.

Figure 2:
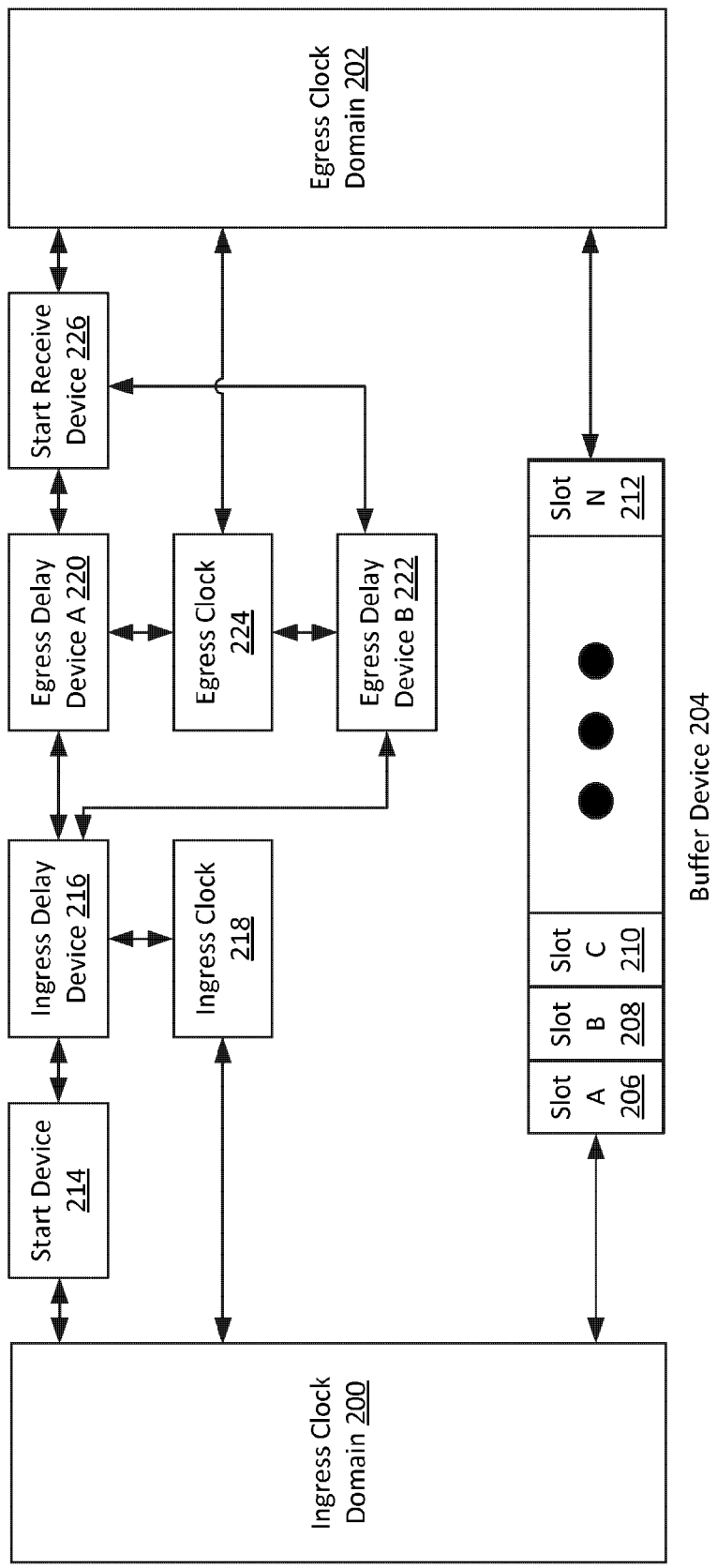
FIG. 2 shows a system in accordance with one or more embodiments of the invention.

FIG. 2 shows a system in accordance with one or more embodiments of the invention. As shown in FIG. 2, the system includes an ingress clock domain (200), an egress clock domain (202), a buffer (204), a start device (214), an ingress delay device (216), an ingress clock (218), egress delay device A (220), egress delay device B (222), an egress clock (224), and a start receive device (226). In one or more embodiments of the invention, the buffer (204) includes any number of buffer slots (e.g., buffer slot A (206), buffer slot B (208), buffer slot C (210), buffer slot N (212)), each of which correspond to a buffer address. Each of these components is described below.

In one or more embodiments of the invention, each of the ingress clock domain (200), the egress clock domain (202), the buffer (204), the start device (214), the ingress clock (218), and the egress clock (224) are substantially similar to like named components shown in FIG. 1 and described above. In one or more embodiments of the invention, egress delay device A (220) is substantially similar to egress delay device (120) shown in FIG. 1 and described above.

In one or more embodiments of the invention, the difference between the system shown in FIG. 1 and the system shown in FIG. 2 is the presence of egress delay device B. In one or more embodiments of the invention, the ingress delay device (216) includes further functionality to transmit the start signal to egress delay device B (222) in addition to egress delay device A (220).

In one or more embodiments of the invention, egress delay device B (222) is substantially similar to egress delay device A (220), except that egress delay device B (222)

samples the start signal on the falling edge of the egress clock cycle. Such sampling may be performed by sampling on the actual falling clock edge, or by inverting the clock cycle received from the operatively connected egress clock (224) and then sampling the start signal on the rising edge of the inverted clock cycle. In one or more embodiments of the invention, the result of such sampling provides egress delay device B (222) to provide start receive device (226) with a late start signal.

In one or more embodiments of the invention, the start receive device (226) is substantially similar to the start receive device (124) shown in FIG. 1 and described above. However, start receive device (226) includes additional functionality to receive a late start signal from egress delay device B (222), and to sample both the start signal from egress delay device A (220) and the late start signal from egress delay device B (222). In one or more embodiments of the invention, start receive device (226) also includes additional functionality to, in the event that both the start signal from egress delay device A (220) and the late start signal from egress delay device B (222) are asserted when sampled on a rising clock cycle of the egress clock cycle, to increment the read buffer pointer by N+1 instead of by N. In one or more embodiments of the invention, the additional incrementing of the read buffer pointer may further reduce latency of the clock domain crossing data transfer to a half or one cycle of the egress clock cycle.

In one or more embodiments of the invention, although not shown in FIG. 2, the system may further include a device in the ingress clock domain that sends to a depth monitor of the egress clock domain an alert (e.g., a simple write-occurred signal, a set of toggle signals to be read by the depth and that cause counter increment on each transition, etc.) each time a data unit is written into the buffer (204) by the ingress clock domain. The depth monitor may include functionality to increment a buffer depth counter each time such an alert is received, and to decrement the counter each time a data unit is read from the buffer.

In one or more embodiments of the invention, the depth monitor includes functionality to determine if the depth of the read buffer is greater than one and, if so, to determine when an idle frame is read from the buffer and, in response, and, when received, increment the read buffer pointer by two buffer addresses, thereby reducing the read buffer depth by two in a given egress domain clock cycle rather than one, as is otherwise the usual read buffer depth reduction in a given egress domain clock cycle.

In one or more embodiments of the invention, the depth monitor also includes functionality to, if the read buffer exceeds a depth threshold, to send a request to the ingress clock domain to perform a buffer depth reduction action (e.g., pause writing new data units into the buffer for a time period, insert more idle frames into the data stream, etc.).

While FIG. 2 shows a configuration of components, other configurations may be used without departing from the scope of the invention. Accordingly, embodiments disclosed herein should not be limited to the configuration of components shown in FIG. 2.

Figure 3A:
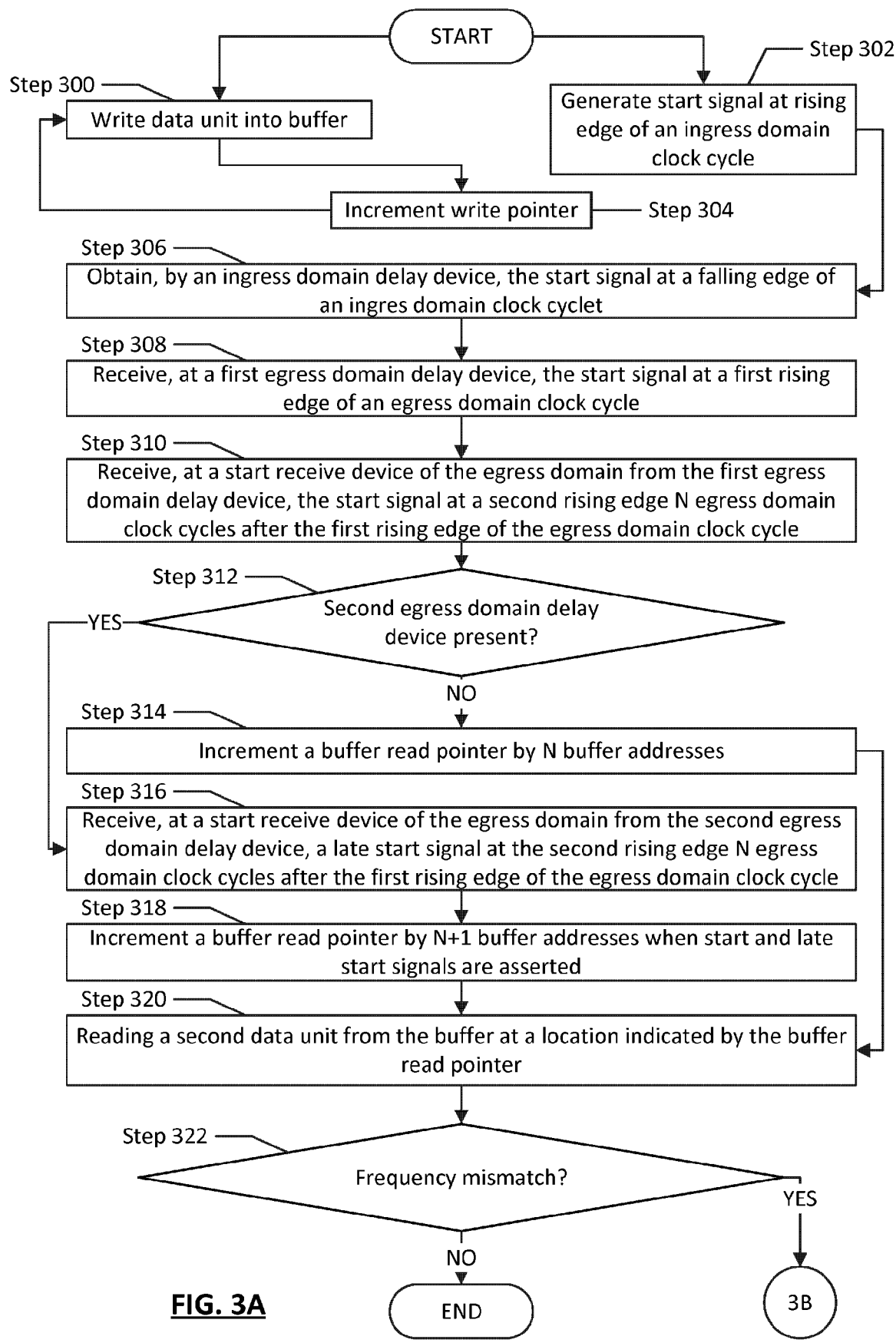
FIG. 3A shows a flowchart in accordance with one or more embodiments of the invention.

FIG. 3A shows a flowchart describing a method for performing clock domain crossing in accordance with one or more embodiments of the invention. One or more steps shown in FIG. 3A may be omitted or repeated, and any steps may be performed in any different order among different embodiments of the invention.

In Step 300, a data unit is written to a buffer to which an ingress clock domain and an egress clock domain are operatively connected. The data unit may be any size, and may be written to the buffer upon a rising clock edge of an ingress clock domain cycle.

At substantially the same time as the data unit is written to the buffer in Step 300, a start signal may be generated in the ingress clock domain in Step 302. In one or more embodiments of the invention, generation of the start signal includes asserting the start signal by changing the start signal from a logical low to a logical high signal (e.g., from logical zero to logical one).

In one or more embodiments of the invention, though not shown in FIG. 3A, prior to Steps 300 and 302, a write buffer pointer and a read buffer pointer are initialized to a common buffer pointer position. In one or more embodiments of the invention, such initialization occurs after power on or reset of one or more devices in which the ingress and/or egress clock domain exist.

In Step 302, a start signal is generated at the rising edge of an ingress clock cycle. In one or more embodiments of the invention, the start signal is generated by asserting a logical high signal.

In Step 304, after data is written to the buffer in Step 300, a write buffer pointer is incremented, and the method returns to Step 300 to write another data unit to the buffer on the next ingress clock cycle rising edge.

In Step 306, an ingress delay device samples the start signal on the subsequent falling edge of the ingress clock cycle. In one or more embodiments of the invention, sampling the start signal on the falling edge after it is previously asserted on the rising edge leads to a latency delay of half of an ingress clock cycle, which may represent a latency improvement of half of an ingress clock cycle over sampling, by the ingress delay device, the start signal at the next rising edge of the ingress clock cycle.

In Step 308, the start signal is sampled at a rising edge of the egress clock cycle an egress delay device. In one or more embodiments of the invention, the egress delay device introduces N egress clock cycles of delay into propagation of the start signal. For example, the egress delay device may include two delay flip flops that each introduce one egress clock cycle of delay, for a total of two egress clock cycles of delay (i.e., N=2) introduced by the egress delay device.

In Step 310, after the delay introduced by the ingress delay device in Step 306, and the N delay introduced by the egress delay device in Step 308, the asserted start signal is received by a start receive device on the rising edge of an egress clock cycle.

In Step 312, a determination is made whether a second egress domain delay device is present in the system. If the system is a system that includes a second egress data delay device, the method proceeds to Step 316. If on the other hand, the system includes no such random delay devices, the method proceeds to Step 314.

In Step 314, the read buffer pointer is incremented by N (e.g., 2) buffer addresses. In one or more embodiments of the invention, the N buffer positions that are skipped by the incrementing include data units that are part of a data unit training set, and, as such, receipt of such data units is not necessary for the egress data domain. In one or more embodiments of the invention, after incrementing the read buffer pointer by N buffer addresses, the method proceeds to Step 320.

In one or more embodiments of the invention, in Step 316, based on the presence of a second egress delay device, as determined in Step 312, the start receive device receives a late start from the second egress delay device. In one or more embodiments of the invention, the second egress delay device also delays the start signal by N egress clock cycles, but samples the start signal to determine whether it is asserted on the falling edge of the egress clock cycle rather than on the rising edge (as the first egress delay device does).

In Step 318, having both the start and late start signal, the start receive device determines that both are asserted on a given rising edge of the egress clock cycle. In one or more embodiments of the invention, based on this determination, the read buffer pointer is incremented by N+1 rather than by N, which may result in further latency reduction for the transfer of data between clock domains than incrementing only by N. Though not shown in FIG. 3A, if both start from the first egress delay device and late start from the second egress delay device are not asserted, the method returns to Step 314, and the read buffer pointer is only incremented by N buffer addresses.

In Step 320, a second data unit is read from the buffer at a location indicated by a current position of the read buffer pointer, thereby passing the data unit into the egress clock domain.

In Step 322, a determination is made whether the frequency of the ingress clock and the egress clock match. In one or more embodiments of the invention, the frequencies of each clock domain is measured and compared to determine if they are the same. In one or more embodiments of the invention, if there is no mismatch, the method ends. In one or more embodiments of the invention, if there is a frequency mismatch, the method proceeds to FIG. 3B.

Figure 3B:
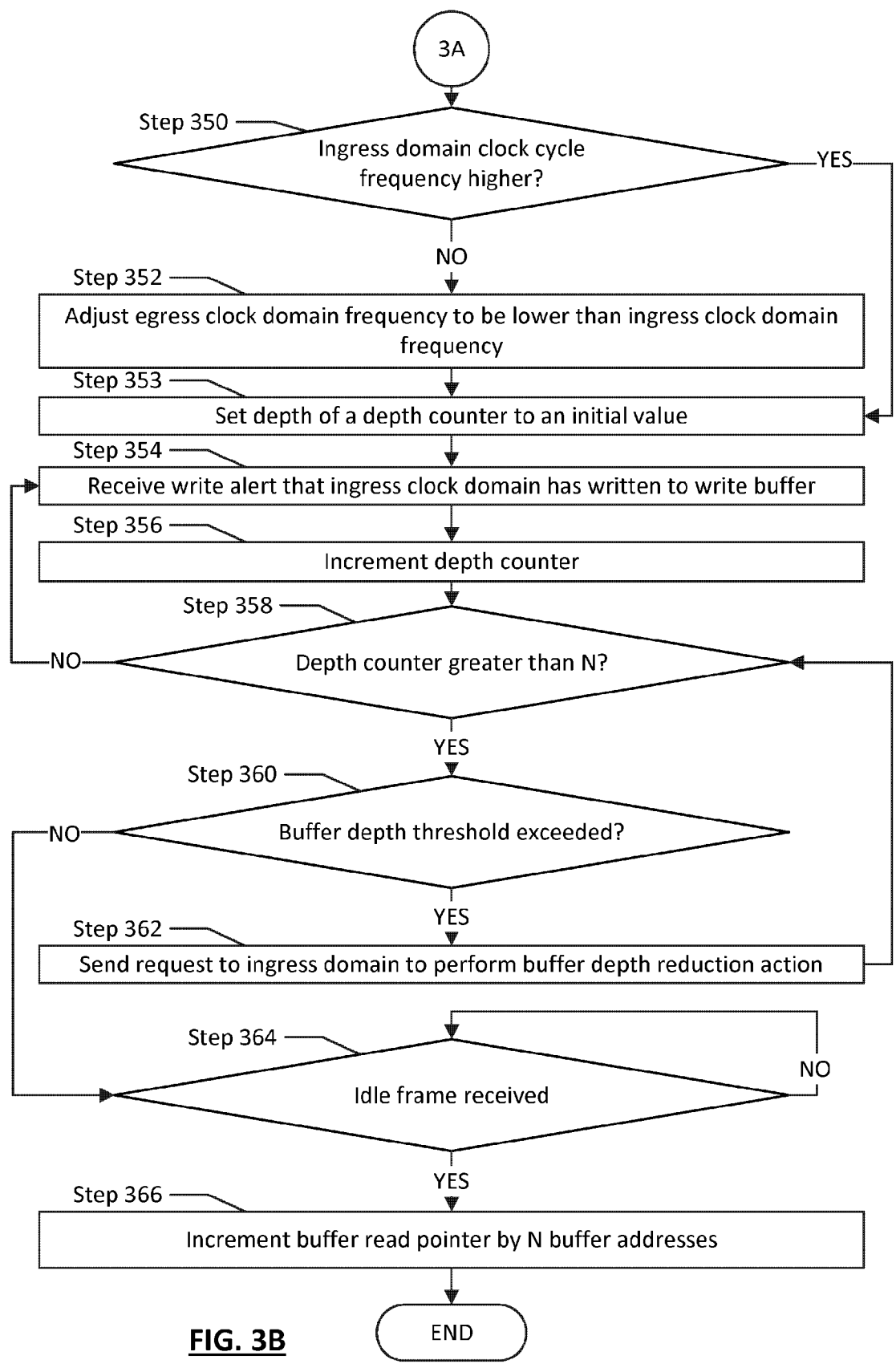
FIG. 3B shows a flowchart in accordance with one or more embodiments of the invention.

FIG. 3B shows a flowchart describing a method for performing clock domain crossing in accordance with one or more embodiments of the invention. One or more steps shown in FIG. 3B may be omitted or repeated, and any steps may be performed in any different order among different embodiments of the invention.

In Step 350, a determination is made whether the ingress domain clock cycle frequency is higher than the egress clock domain clock cycle frequency. In one or more embodiments of the invention, the determination is made by sampling each frequency, and then performing a comparison to determine which is higher. In one or more embodiments of the invention, if the ingress clock domain clock cycle frequency is not higher than the egress clock domain frequency, the method proceeds to Step 352. If on the other hand, a determination is made that the ingress domain clock cycle frequency is higher than the egress clock domain clock cycle frequency, then the method proceeds to Step 354.

In Step 352, based on the determination that the frequency of the clock cycle in the ingress clock domain is lower than that of the egress clock domain, in one or more embodiments of the invention, the frequency of the clock cycle of the egress clock domain is reduced to be less than the frequency of the clock cycle of the ingress clock domain. In Step 353, a depth counter in the egress clock domain is set to an initial value (e.g., zero, one, etc.)

In Step 354, an alert is received that the ingress clock domain has written a data unit to the write buffer. In one or more embodiments of the invention, the alert is in the form of a change in state of a toggle signal being transmitted from the ingress clock domain to a depth monitor device of the egress clock domain.

In Step 356, in response to the write alert received in Step 354, the depth monitor device increments a depth counter. In one or more embodiments of the invention, the depth counter monitors the depth of the read queue (i.e., how many writes have not yet been read from the buffer).

In Step 358, a determination is made whether the depth counter is greater than N (e.g., two). In one or more embodiments of the invention, if the depth counter is not greater than N, the method returns to Step 354 to await another write alert. If, on the other hand, a determination is made that the depth counter is greater than N, the method proceeds to Step 360.

In Step 360, a determination is made whether a buffer depth threshold has been exceeded. In one or more embodiments of the invention, a buffer depth threshold represents a buffer depth that may lead to buffer overflow if not addressed. In one or more embodiments of the invention, if the buffer depth threshold has been exceeded, the method continues to Step 362. If, on the other hand, the buffer depth threshold has not been exceeded, the method may proceed to Step 364.

In Step 362, if the buffer depth threshold has been exceeded, the egress clock domain, or any component therein or operatively connected, may send to the ingress clock domain a request to perform a buffer depth reduction action. Examples of such actions include, but are not limited to, pausing for a time writes into the buffer, and inserting more idle frames into the data stream being passed between the ingress clock domain and the egress clock domain via embodiments of the invention described herein. In one or more embodiments of the invention, once the buffer depth reduction action has been requested, the method returns to Step 358.

In Step 364, a determination is made whether an idle frame has been received. In one or more embodiments of the invention, if an idle frame has been read from the buffer, the method proceeds to Step 366. If, on the other hand, an idle frame has not been read from the buffer, the method loops back to Step 364 to await receipt of an idle frame from the ingress clock domain.

In Step 366, based on the determination that an idle frame has been read from the buffer, and the fact that a first idle frame indicates that there will be N cycles of idle frames, the read buffer pointer is incremented by N (e.g., two) buffer addresses.

Figure 4:
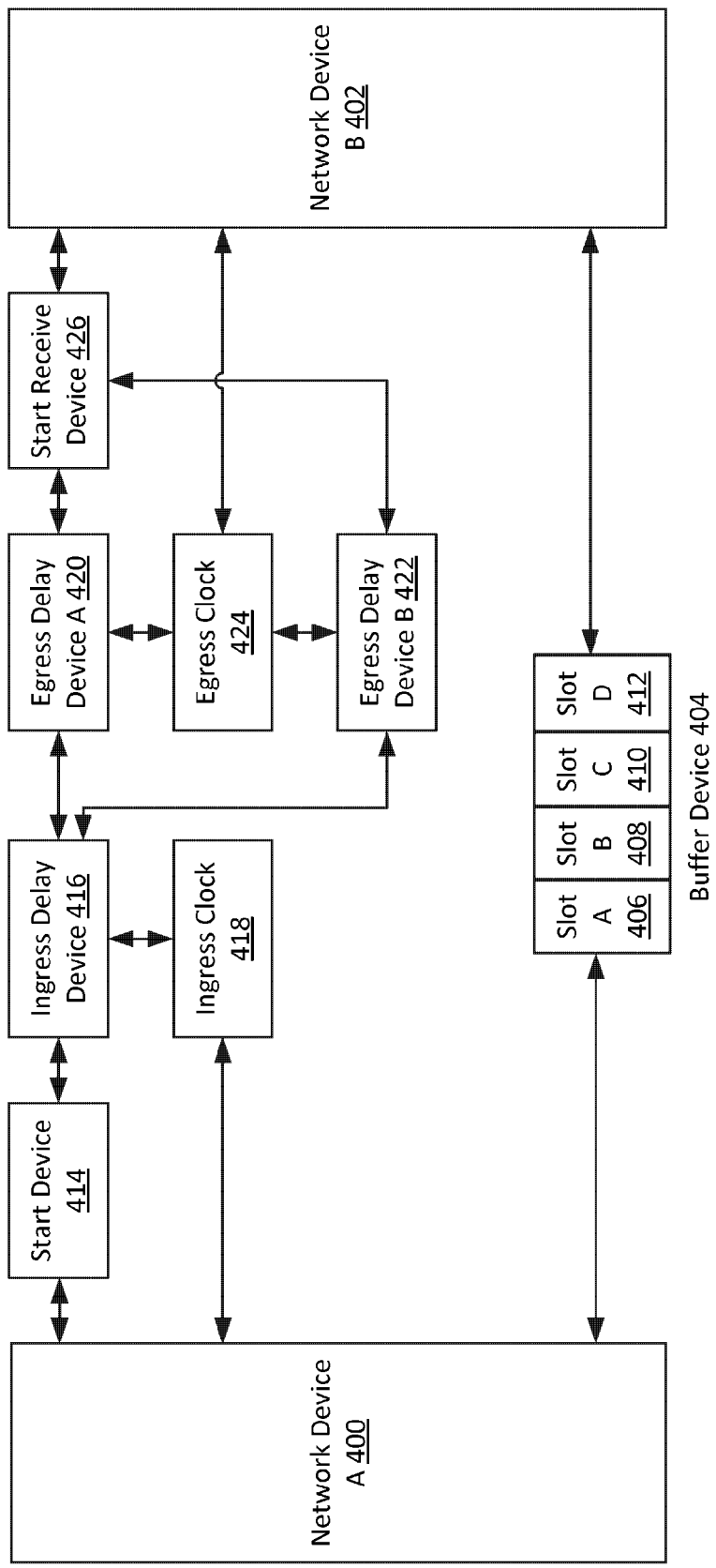
FIG. 4 shows an example in accordance with one or more embodiments of the invention.

FIG. 4 shows an example in accordance with one or more embodiments of the invention. The following example is for explanatory purposes only and not intended to limit the scope of the invention.

Referring to FIG. 4, consider a scenario in which network device A (400) is a first clock domain clocked by ingress clock (418), and network device B (402) is a second clock domain clocked by egress clock (424). Start device (414) and ingress delay device (416) are also operatively connected to ingress clock (418). Egress delay device A (420), egress delay device B (422), and start receive device (426) are operatively connected to egress clock (424). Each of egress delay device A and egress delay device B include two flip flops, meaning they, in parallel, introduce N=2 delay cycles of the egress clock. Though not shown in FIG. 4, network device (402) also includes a depth monitor and a buffer depth counter. Network device A (400) and network device B are operatively connected by and share data units via a buffer (404) that includes a number of buffer slots (406, 408, 410, 412).

In such a scenario, both network device A (400) and network device B (402) are initially powered on. A write buffer pointer is initialized to a buffer address in the buffer (404), and a read buffer pointer is initialized to the same buffer slot (e.g., buffer slot A (406)).

Once network device A (400) writes a data unit to the buffer (404), in parallel, a start signal is generated by the start device (414) on a rising edge of the ingress clock (418). On the next falling edge of the ingress clock cycle, the ingress delay device (416) samples the asserted start signal. Upon sampling of the asserted start signal, the ingress delay device passes the start signal to the egress delay device A (420) and the egress delay device B (422). Egress delay device A samples the asserted start signal on the rising edge of the egress domain clock cycle, and egress delay device B samples the asserted start signal on the falling edge of the egress domain clock cycle to produce a late start signal/ Both the start signal, and the late state signal, are then passed to the start receive device on the next rising edge of the egress domain clock cycle. Upon receipt of the signals, the start receive device determines that they are both asserted, and, thus, increments the read buffer pointer by N+1 rather than N, thereby gaining an increased reduction in latency of transferring data between the clock domain of network device A (400) and network device B (402).

After the start signal has been transferred from the clock domain of network device A (400) and the clock domain of network device B (402), a determination is made, via frequency sampling, that the frequency of the clock domain of network device B (402) is lower than that of network device A (400). As such, in order to avoid eventual buffer overflow, measures must be taken to allow the read buffer pointer, which usually increments once per read based on the clock cycle of the clock domain of network device B (402), to more closely track the write pointer, which is incrementing with each write based on the faster clock cycle of the clock domain of network device A (400).

To achieve this goal, each time network device A (400) writes to the buffer (404), a signal is sent to network device B (402), which increments a buffer depth counter. The buffer depth counter is decremented each time network device B (402) reads from the buffer. As such, the read buffer depth often stays close to zero. However, over time, there may be more writes than reads, causing the buffer depth to grow beyond one. When that happens, network device B (402) may include functionality to determine when an idle frame is read. Idle frames may be configured to last for more at least two egress clock cycles, thereby allowing the read buffer pointer to be incremented by two. This may help mitigate the difference between the faster ingress clock cycle and the slower egress clock cycle. In one or more embodiments of the invention, in the even that such measures are insufficient over time, network device B may send a request to network device A (400) to wither pause in writing data to the buffer, or to insert more strings of idle frames, to mitigate the timing difference between the clocks.

Embodiments of the invention described above may reduce the latency required for transferring date from one clock domain to another clock domain by manipulating a read and/or write pointer positions after efficient transfer of a start signal from one clock domain to another.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing clock domain crossing, the method comprising:
   receiving a start signal from an ingress domain delay device corresponding to an ingress clock domain at a first egress domain delay device corresponding to an egress clock domain,
   wherein the start signal is received at a first rising edge of an egress domain clock cycle, and
   wherein the start signal is generated in the ingress clock domain at a rising edge of an ingress clock cycle when a first data unit is written into a buffer, the buffer couples the ingress clock domain and the egress clock domain, a write buffer pointer is incremented after the first data unit is written into the buffer, and the start signal is received by the ingress domain delay device at a next falling edge of the ingress clock cycle;
   receiving, from the first egress domain delay device at a start receive device, the start signal at a second rising edge of the egress domain clock cycle, wherein the second rising edge of the egress domain clock cycle is N egress domain clock cycles after the first rising edge, and "N" represents a number of the egress domain clock cycles by which the start signal is delayed;
   incrementing, in response to receipt of the start signal by the start receive device, a buffer read pointer of the buffer by at least N buffer addresses to reduce latency of the clock domain crossing; and
   reading, after incrementing the buffer read pointer, a second data unit from the buffer at a location indicated by the buffer read pointer.

2. The method of claim 1, further comprising:
   receiving, from the ingress domain delay device at a second egress domain delay device, the start signal at a falling edge of the egress domain clock cycle;
   receiving, from the second egress domain delay device at the start receive device, a late start signal at the second rising edge of the egress domain clock cycle; and
   making a determination, by the start receive device, before incrementing the buffer read pointer, that both the start signal and the late start signal are asserted,
   wherein, based on the determination, the buffer read pointer of the buffer is incremented by N+1 buffer units rather than by N buffer units thereby gaining an increased reduction in latency of transferring the data unit between the ingress clock domain and the egress clock domain.

3. The method of claim 2, further comprising, before writing the first data unit into the buffer, sampling the ingress clock cycle and the egress domain clock cycle to determine that an ingress clock frequency of the ingress clock cycle is higher than an egress clock frequency of the egress domain clock cycle.

4. The method of claim 2, further comprising:
   before writing the first data unit into the buffer, sampling the ingress clock cycle and the egress domain clock cycle to make a second determination that an ingress clock frequency is lower than an egress clock frequency; and
   adjusting, based on the second determination that the ingress clock frequency is lower than the egress clock frequency, the egress domain clock cycle such that the egress clock frequency is lower than the ingress clock frequency.

5. The method of claim 3, further comprising:
   receiving, at a depth monitor device of the egress clock domain, from a write alert device a first alert that a first write has occurred in the buffer and a second alert that a second write has occurred in the buffer;
   incrementing a buffer depth counter by two in response to the first alert and the second alert;

making a second determination, using the buffer depth counter, that a depth of the buffer depth counter is greater than one;

making a third determination, based on the second determination, that an idle data unit has been read from the buffer by the egress clock domain; and incrementing, in response to the third determination, the buffer read pointer by two buffer addresses.

6. The method of claim 5, further comprising, before the third determination:

making a fourth determination, using the buffer depth counter, that a buffer depth has exceeded a buffer depth threshold; and sending a request to the ingress clock domain to perform a buffer depth reduction action.

7. The method of claim 5, wherein the first alert and the second alert are received as a first toggle signal and a second toggle signal.

8. The method of claim 1, wherein, before writing the first data unit into the buffer, the buffer write pointer and the buffer read pointer are both initialized to an initial pointer buffer address.

9. The method of claim 1, wherein the first data unit is a portion of a set of training data units.

10. The method of claim 1, wherein the ingress clock domain comprises a first network device and the egress clock domain comprises a second network device.

11. A system for performing clock domain crossing, the system comprising:

a first egress domain delay device of an egress clock domain, comprising circuitry, operatively connected to an ingress domain delay device of an ingress clock domain, and configured to:

receive, from the ingress domain delay device, a start signal at a first rising edge of an egress domain clock cycle, wherein the start signal is generated in an ingress clock domain at a rising edge of an ingress clock cycle when a first data unit is written into a buffer, the buffer couples the ingress clock domain and the egress clock domain, a write buffer pointer is incremented after the first data unit is written into the buffer, and the start signal is received by the ingress domain delay device at a next falling edge of the ingress clock cycle;

a start receive device comprising circuitry, operatively connected to the first egress domain delay device, and configured to:

receive the start signal at a second rising edge of the egress domain clock cycle, wherein the second rising edge of the egress domain clock cycle is N egress domain clock cycles after the first rising edge, and "N" represents a number of the egress domain clock cycles by which the start signal is delayed; and increment, in response to receipt of the start signal by the start receive device, a buffer read pointer of the buffer by at least N buffer addresses; and read, after incrementing the buffer read pointer, a second data unit from the buffer at a location indicated by the buffer read pointer.

12. The system of claim 11, further comprising:

a second egress domain delay device comprising circuitry, operatively connected to an ingress domain delay device, and configured to:

receive, from the ingress domain delay device, the start signal at a falling edge of the egress domain clock cycle;

wherein the start receive device is further configured to:

receive, from the second egress domain delay device, a late start signal at the second rising edge of the egress domain clock cycle;

make a determination, before incrementing the buffer read pointer, that both the start signal and the late start signal are asserted; and based on the determination, increment the buffer read pointer of the buffer by N+1 buffer units rather than by N buffer units thereby gaining an increased reduction in latency of transferring the data unit between the ingress clock domain and the egress clock domain.

13. The system of claim 12, wherein the ingress clock domain, before writing the first data unit into the buffer, is configured to sample the ingress clock cycle and the egress domain clock cycle to determine that an ingress clock frequency of the ingress clock cycle is higher than an egress clock frequency of the egress domain clock cycle.

14. The system of claim 12, wherein the egress clock domain is configured to:

before writing the first data unit into the buffer, sample the ingress clock cycle and the egress domain clock cycle to make a second determination that an ingress clock frequency is lower than an egress clock frequency; and adjust, based on the second determination that the ingress clock frequency is lower than the egress clock frequency, the egress domain clock cycle such that the egress clock frequency is lower than the ingress clock frequency.

15. The system of claim 13, further comprising:

a depth monitor device comprising circuitry, operatively connected to the ingress clock domain, and configured to:

receive, from a write alert device of the ingress clock domain, a first alert that a first write has occurred in the buffer and a second alert that a second write has occurred in the buffer;

increment a buffer depth counter by two in response to the first alert and the second alert;

make a second determination, using the buffer depth counter, that a buffer depth counter is greater than one;

make a third determination, based on the second determination, that an idle data unit has been read from the buffer by the egress clock domain; and increment, in response to the third determination, the buffer read pointer by two buffer addresses.

16. The system of claim 15, wherein, before the third determination, the depth monitor device is further configured to:

make a fourth determination, using the buffer depth counter, that a buffer depth has exceeded a buffer depth threshold; and send a request to the ingress clock domain to perform a buffer depth reduction action.

17. The system of claim 15, wherein the first alert and the second alert are received as a first toggle signal and a second toggle signal.

18. The system of claim 11, wherein, before writing the first data unit into the buffer, the buffer write pointer and the buffer read pointer are both initialized to an initial pointer buffer address.

19. The system of claim 11, wherein the first data unit is a portion of a set of training data units.

20. The system of claim 11, wherein the ingress clock domain is a first network device and the egress clock domain is a second network device.

* * * * *